United States Patent [19]
Mori

[11] 3,865,534
[45] Feb. 11, 1975

[54] DEVICE FOR CLAMPING A MOLD FRAME USED FOR CENTRIFUGAL COMPACTION OF CONCRETE

[75] Inventor: Takemitsu Mori, Tokyo, Japan
[73] Assignee: Nippon Concrete Industries Co. Ltd., Tokyo, Japan
[22] Filed: Dec. 11, 1973
[21] Appl. No.: 423,769

Related U.S. Application Data
[62] Division of Ser. No. 258,355, May 31, 1972, abandoned.

[30] Foreign Application Priority Data
Jan. 26, 1972  Japan.............................. 47-10449

[52] U.S. Cl............................ 425/451.7, 164/292, 249/219 R, 403/338, 425/435, 425/451.9
[51] Int. Cl...................... B28b 21/80, B22d 13/10
[58] Field of Search......... 164/292; 425/435, 450 C, 425/182; 249/173, 192, 196, 219 R; 403/335, 338

[56] References Cited
UNITED STATES PATENTS
2,526,381  10/1950  Mathis ............................. 249/196
2,623,260  12/1952  Jobe................................. 425/435

FOREIGN PATENTS OR APPLICATIONS
1,169,281  11/1969  Great Britain..................... 287/129

Primary Examiner—Robert D. Baldwin
Attorney, Agent, or Firm—Oblon, Fisher, Spivak, McClelland & Maier

[57] ABSTRACT

This invention relates to a device for clamping a mold frame used for the centrifugal compaction of concretes wherein angle-shaped flanges are provided at the associated portion between cylindrical long shell plates made of a steel plate cut into two, nuts are fixed or tightly attached to one flange concentrically with bolt penetrating holes formed concentrically at one side or both sides of the associated portions, ]-shaped retaining metal fittings are tightly attached to the other flange and clamping bolts screwed with nuts are internally threaded in said retaining metal fittings, or guides concurrently used as retaining metal fittings having staged holes and clamping bolts externally threaded with stopper rings are internally threaded in such guides concurrently used as retaining metal fittings under the pressure of springs thereby to prevent the clamping bolts from falling off.

4 Claims, 8 Drawing Figures

DEVICE FOR CLAMPING A MOLD FRAME USED FOR CENTRIFUGAL COMPACTION OF CONCRETE

This is a division, of application Ser. No. 258,355, filed May 31, 1972 now abandoned.

SUMMARY OF THE INVENTION

This invention relates to a device for clamping a mold frame used for the centrifugal compaction of concretes, which device is used in the mold frame cut into two for shaping concrete piles, concrete poles, etc. by centrifugal force. The conventional devices of clamping the mold frame used for the centrifugal compaction of concretes involve such drawbacks that a simple bolt and nut mechanism has been used, and, therefore, upon releasing the mold in produced concrete piles, concrete poles, etc., bolts and nuts are completely removed from the flange parts of the mold frame, and it takes much time and trouble at the time of mold releasing and clamping for shaping, and the bolts and nuts are occasionally damaged and lost.

The present invention has for its primary object to remove such drawbacks, and the device according to the present invention has a structure wherein the retaining metal fittings for preventing the bolts from completely falling off from the flanges, even when the clamping bolts are released from the nuts, are attached to a flange part and catching members which catch the retaining metal fitting are attached to the clamping bolts.

According to the present invention falling off of the clamping bolts can be completely prevented and simultaneously disadvantages such as damage and missing of bolts and nuts are, of course, prevented and mold releasing from the mold frame and shaping operation therefor can be accomplished rapidly, simply and easily by a small number of operator.

Other objects and features of the present invention may be more fully understood by a few examples embodying the present invention as will be described hereinbelow.

DETAILED DESCRIPTION OF THE INVENTION

Figure 1:
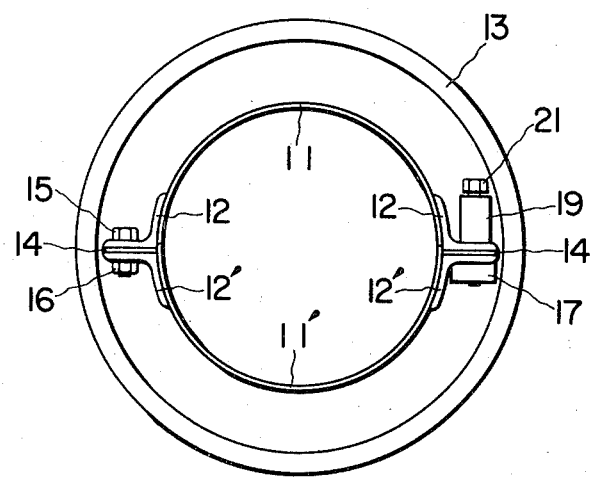
FIG. 1 is a front elevation showing a mold frame illustrating a first example embodying the present invention.
Figure 2:
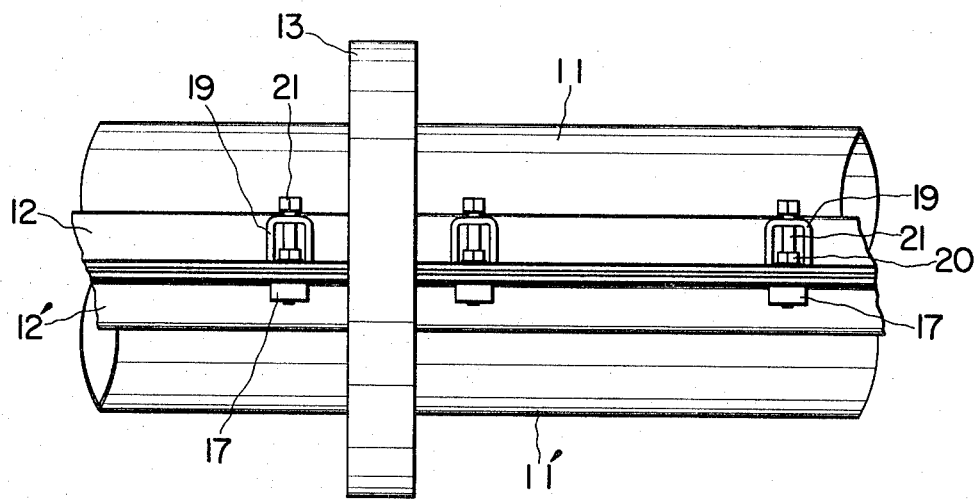
FIG. 2 is a side elevation showing a part of the mold frame shown in FIG. 1.
Figure 3:
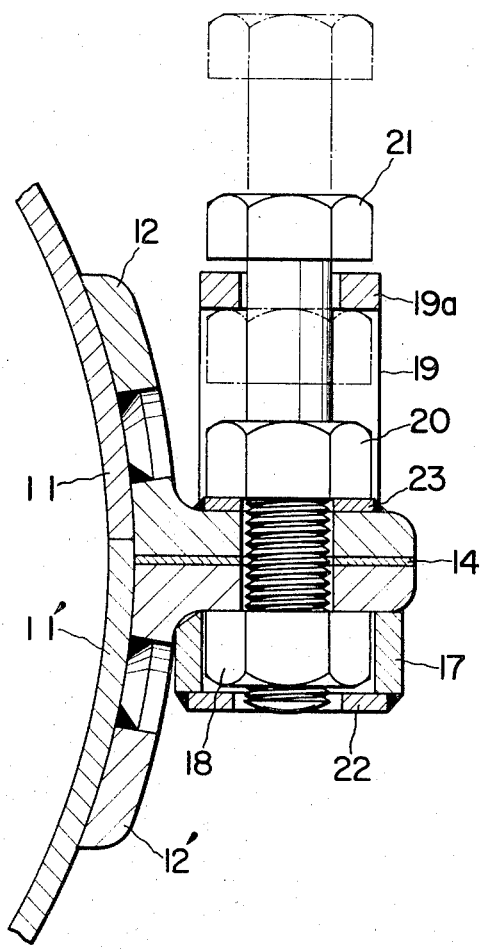
FIG. 3 is an enlarged front view, partly cut away, showing the essential part of the mold frame shown in FIG. 1.
Figure 4:
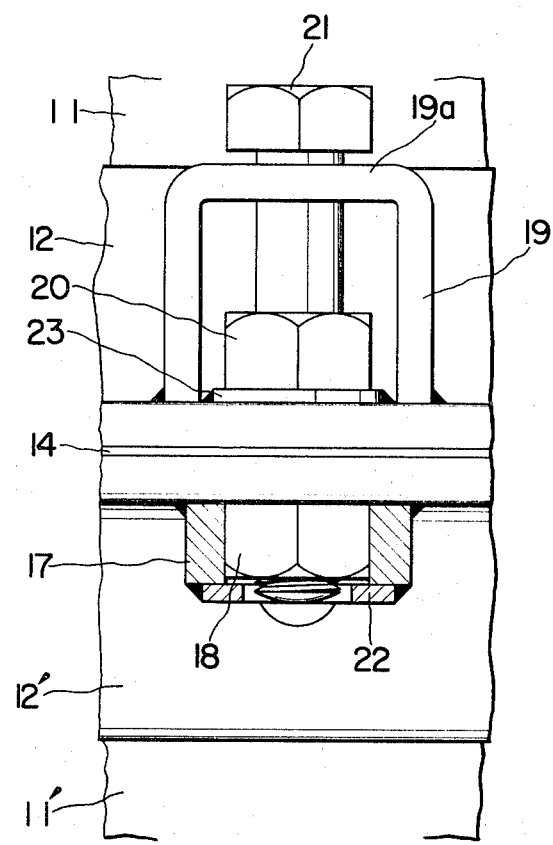
FIG. 4 is an enlarged side elevation, partly cut away, showing the essential part of the mold frame shown in FIG. 1.
Figure 5:
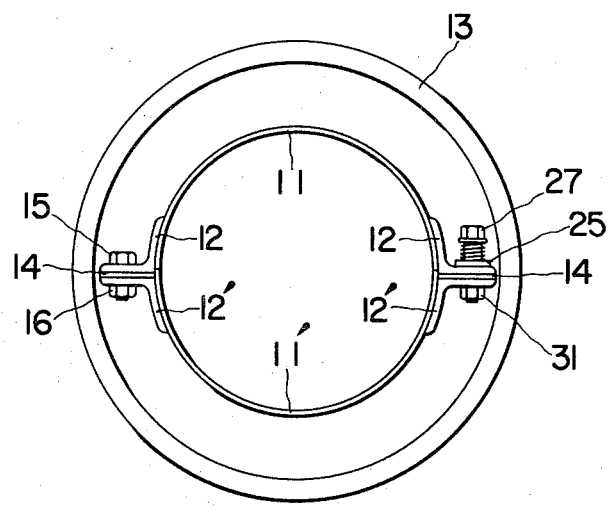
FIG. 5 is a front elevation showing the mold frame illustrating a second example embodying the present invention.
Figure 6:
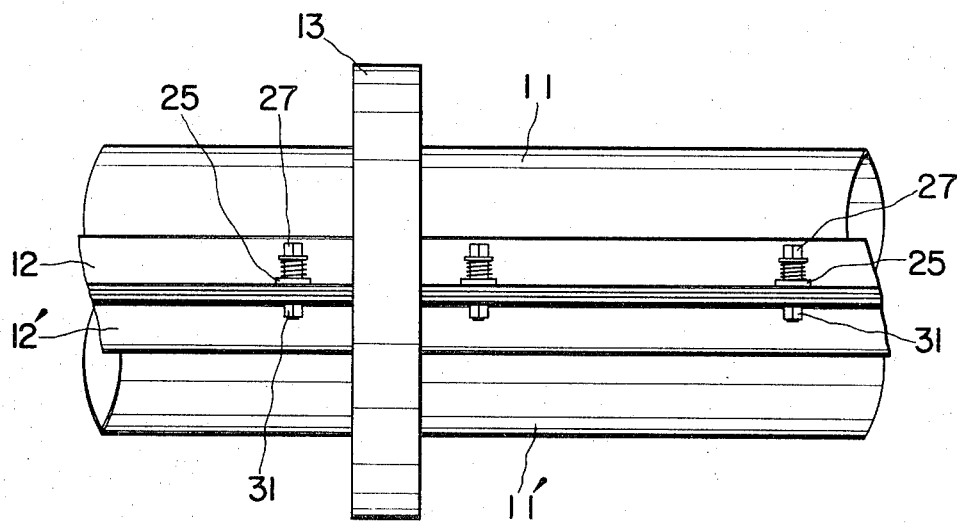
FIG. 6 is a side elevation showing a part of the mold frame shown in FIG. 5.
Figure 7:
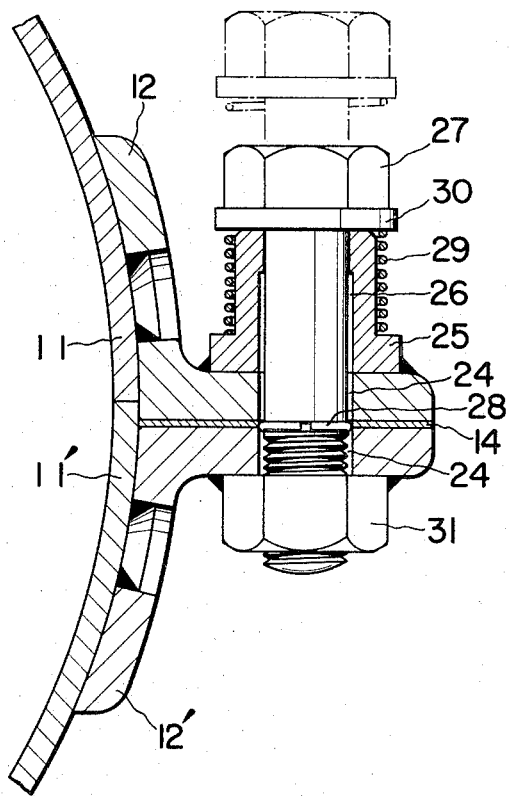
FIG. 7 is an enlarged front elevation, partly cut away, showing the essential part of the mold frame shown in FIG. 5.
Figure 8:
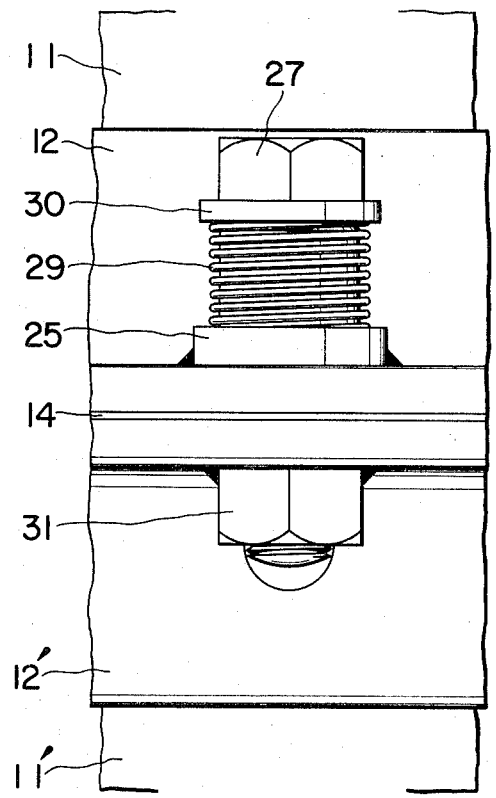
FIG. 8 is an enlarged side elevation, partly cut away, showing the essential part of the mold frame shown in FIG. 5.

In FIGS. 1 and 4, inclusive, showing the first example embodying the present invention, reference numerals, 11, 11' designate respectively long shell plates made of a steel plate and having a semicircular section, angle-shaped flanges 12, 12' being welded at each associated portion by slightly sliding the upper part from the lower part and substantially semicircular rotary ring members 13 are disposed at a suitable interval so that such ring members are formed into an annular shape as a whole, thereby to constitute a mold frame. In the flanges 12, 12' at both associated portions of the mold frame, one associated portion (close side) is fixed to each other by means of a bolt 15 and a nut 16 through packing 14 and the clamping device according to the first example of the present invention is installed at the other associated portion (open side).

The clamping device according to the present invention has such a structure that a check metal fitting 17 is welded to the lower flange 12' of the two flanges 12, 12' having common bolt penetrating holes therein and the metal fitting 17 has a stepped hole of larger dimension on a common axis therewith for receiving and fixing a clamping nut 18. A bolt 21 screwed with a nut 20 in advance is internally inserted in and retained by a ]-shaped retaining metal fitting 19 fixed to the upper flange 12.

A porous washer 22 is welded to the check metal fitting 17 so that the clamping nut 18 does not fall off and the threaded portion of the bolt 21 can protrude. Reference numeral 23 designates a stationary washer which is welded to the upper flange 12 and limits the advance of the nut 20.

Further, in the case of carrying out the mold releasing operation, the bolt 21 is removed from the clamping nut 18 by means of an impact wrench, and one of mold associated portion is slightly released to facilitate extrusion and extraction of the product and releasing of the mold. Upon this occasion, the bolt 21, as shown by one-dot chain line, is prevented from falling off because the nut 20 screwed with the bolt 21 abuts against the upper plate 19a of the retaining metal fitting 19. Further, since the side surface of the retaining metal fitting 19 is open, any damage of the bolt 21 can be easily discovered. The clamping nut 18 is prevented from falling off by means of the check metal fitting 17 and the washer 22.

As has been mentioned in the foregoing, when the clamping device according to the present invention is used, it does not require many hands, unlike the case of the conventional devices, but the bolt attaching and detaching operation at the time of mold releasing, and mold shaping can be simply carried out, and any damage of the bolt 21 can be easily found thereby to perform safe and accurate operations.

Furthermore, it should be understood that the present invention is not limited to the foregoing structure but, for instance, the clamping device according to the present invention can be installed at both sides of the associated portion of the flanges.

Then, in FIGS. 5 through 8, inclusive, which show the second example embodying the present invention, reference numerals 11, 11' designate long shell plates made of a steel plate; 12, 12' are the flanges; 13 are rotary ring members; 14 indicates packings; 15 is a bolt; and 16, a nut. The above described members are identical with those in the first Example illustrated in FIGS. 1 through 4, inclusive. Reference numeral 25 designates guides concurrently used as retaining metal fittings having staged holes 26 which are welded and fixed to the upper flange 12 concentrically with concentric bolt holes 24, 24 provided in the flanges 12, 12'. Reference numeral 27 designates a clamping bolt outwardly supporting a stopper ring 28 in an outer peripheral groove at the screw end, and the screw side is received in the staged hole 26 of the guide concurrently used as retaining metal fitting 25 and the stopper ring 28 is in contact with the staged portion of the staged hole 26, whereby the clamping bolt 27 is prevented from falling off. Reference numeral 29 designates a spring provided through a washer 30 between the clamping bolt 27 and the guide concurrently used as retaining metal fitting 25; and 31 is a nut concentrically welded to the bolt hole 24 on the lower flange 12'. Accordingly, when the clamping bolt 27 is loosened from the state at the time of clamping shown in solid line in FIGS. 7 and 8, the bolt 27 comes off from the nut 31 and assumes a state shown by imaginary line in the drawing, and extrusion and extraction of the concrete product and mold releasing can be easily carried out. Upon this occasion, the clamping bolt 27 is pushed up by means of the spring 29, and its falling off is prevented by the engagement of the staged portion of the stopper ring 28 with the staged hole 26.

Thus, according to the second example of the present invention the following operational effects can be obtained.

1. The step of inserting the clamping bolt into the bolt hole can be curtailed.
2. Misplacing of the clamping bolt can be prevented.
3. The structure is simple, and the replacement of the clamping bolt can be carried out easily by removing the stopper ring.
4. The clamping bolt is led by the guide concurrently used as a retaining metal fitting and is inserted straight, and thus reduces wear.
5. Troubles rarely occur because the same clamping bolt and nut are constantly utilized.

In the foregoing, a few examples embodying the present invention have been explained. It should be understood that various modifications may be possible without departing from the spirit of the present invention with respect to the dimensional ratio and arrangement of each part.

I claim:

1. In a device for clamping a mold frame used for the centrifugal compaction of concrete which is characterized by angle-shaped flanges having one arm thereof fixedly secured to respective ones of a pair of long shell steel plates of semi-circular section which are positioned together to form a cylindrical frame, said angle-shaped flanges having concentric bolt penetrating holes formed in the other arms thereof, the improvement comprising:
   a bolt for insertion through said concentric holes from one side of the other arm of one of said flanges;
   a nut for positioning on the opposite side of the other arm of the other of said flanges for internally receiving said bolt in threaded engagement therewith;
   means for retaining said nut in abutting relation with said opposite side of said other arm of said other of said flanges and for preventing accidental removal thereof;
   a retaining metal fitting guide means concentrically connected about the hole in said one of said flanges and having an elongated opening therethrough for permitting passage of the threaded portion of said bolt, said opening having a lower staged portion of greater diameter than the upper portion thereby forming an internal shoulder within said retaining metal fitting guide means; and
   a stopper ring secured to the outer periphery of said bolt within the staged portion of said opening of said retaining metal fitting guide means and being slidable therewithin, the diameter of said stopper ring being greater than the diameter of the threaded portion of said bolt, such that said stopper ring engages said shoulder within said retaining metal fitting guide means for preventing removal of said bolt from said retaining metal fitting guide means upon threadedly disengaging said bolt and said nut.

2. A device according to claim 1, further comprising spring means disposed between said retaining metal fitting guide means and the head of said bolt for urging said bolt away from said retaining metal fitting guide means.

3. A device according to claim 1, wherein said nut is welded to the other of said flanges.

4. A device according to claim 1, wherein said retaining metal fitting guide means is welded to said one of said flanges.

* * * * *